United States Patent
Sandstrom

(10) Patent No.: US 7,259,199 B2
(45) Date of Patent: Aug. 21, 2007

(54) TIRE WITH RUBBER CONTAINING IN-SITU RESIN

(75) Inventor: Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 379 days.

(21) Appl. No.: 11/008,377

(22) Filed: Dec. 9, 2004

(65) Prior Publication Data

US 2006/0128841 A1    Jun. 15, 2006

(51) Int. Cl.
*C08K 5/34* (2006.01)

(52) U.S. Cl. .................. 524/100; 524/236; 524/435; 152/450

(58) Field of Classification Search ............. 524/100, 524/236, 435; 152/450
See application file for complete search history.

(56) References Cited

U.S. PATENT DOCUMENTS

| | | | |
|---|---|---|---|
| 3,517,722 A | 6/1970 | Endter et al. ............ 152/359 |
| 3,638,702 A | 2/1972 | Endter ..................... 152/330 |
| 4,092,455 A | 5/1978 | Pinto et al. .............. 428/295 |
| 4,436,853 A | 3/1984 | Schloman, Jr. ........... 524/91 |
| 4,465,807 A | 8/1984 | Giller et al. ............. 525/135 |
| 4,542,186 A | 9/1985 | Giller et al. ............. 525/138 |
| 4,605,696 A | 8/1986 | Benko et al. ............ 524/432 |
| 4,889,481 A | 12/1989 | Morris et al. ............ 431/328 |
| 5,030,692 A | 7/1991 | Durairaj ................... 525/134 |
| 5,194,513 A | 3/1993 | Wideman et al. ........ 525/329.3 |
| 5,206,289 A | 4/1993 | Sinsky et al. ............ 525/114 |
| 5,244,725 A | 9/1993 | Dressler et al. .......... 428/289 |
| 5,405,897 A | 4/1995 | Segatta et al. ........... 524/290 |
| 5,504,127 A | 4/1996 | Wideman et al. ......... 524/91 |
| 5,665,799 A | 9/1997 | Inui et al. ................ 524/87 |
| 5,688,871 A | 11/1997 | Inui et al. ................ 525/346 |
| 5,763,558 A | 6/1998 | Chauvin et al. .......... 528/129 |
| 5,936,056 A | 8/1999 | Durairaj et al. .......... 528/96 |
| 5,945,500 A | 8/1999 | Durairaj et al. .......... 528/96 |
| 6,472,457 B1 | 10/2002 | Durairaj et al. .......... 524/424 |
| 6,541,551 B1 | 4/2003 | Durairaj et al. .......... 524/248 |
| 6,605,670 B1 | 8/2003 | Durairaj et al. .......... 525/132 |

FOREIGN PATENT DOCUMENTS

| | | |
|---|---|---|
| JP | 105249 | 4/2002 |
| WO | 018238 | 3/2004 |

OTHER PUBLICATIONS

European Search Report.

*Primary Examiner*—Peter D. Mulcahy
(74) *Attorney, Agent, or Firm*—John D. DeLong

(57) ABSTRACT

There is disclosed a pneumatic tire having a component containing a rubber composition comprising
  (A) a sulfur-vulcanized rubber compound; and
  (B) the reaction product of
    (1) a methylene acceptor; and
    (2) a combination methylene donor comprising hexamethylenetetramine and at least one N-substituted oxymethyl melamine.

14 Claims, No Drawings

TIRE WITH RUBBER CONTAINING IN-SITU RESIN

BACKGROUND OF THE INVENTION

A tire is a composite of several components each serving a specific and unique function yet all synergistically functioning to produce the desired performance. In several tire components, an in-situ resin is included in a rubber composition to impart desirable properties to the rubber composition, including hardness, tear strength, and adhesion to reinforcement. Typically, methylene acceptor-methylene donor systems are used as in-situ resins. Performance and safety requirements place an ever increasing demand for improved rubber compounds. Therefore, there exists a need for improved in-situ resins.

SUMMARY OF THE INVENTION

There is disclosed a pneumatic tire having a component containing a rubber composition comprising
(A) a sulfur-vulcanized rubber compound; and
(B) the reaction product of
(1) a methylene acceptor; and
(2) a combination methylene donor comprising hexamethylenetetramine and at least one N-substituted oxymethyl melamine.

DETAILED DISCLOSURE OF THE INVENTION

There is disclosed a pneumatic tire having a component containing a rubber composition comprising
(A) a sulfur-vulcanized rubber compound; and
(B) the reaction product of
(1) a methylene acceptor; and
(2) a combination methylene donor comprising hexamethylenetetramine and at least one N-substituted oxymethyl melamine of the formula:

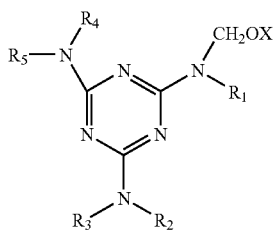

wherein X is hydrogen or an alkyl having from 1 to 8 carbon atoms, $R_1$, $R_2$, $R_3$, $R_4$ and $R_5$ are individually selected from the group consisting of hydrogen, an alkyl having from 1 to 8 carbon atoms, the group —$CH_2OX$ and their condensation products.

The present invention relates to a pneumatic tire. Pneumatic tire means a laminated mechanical device of generally toroidal shape (usually an open torus) having beads and a tread and made of rubber, chemicals, fabric and steel or other materials. The present invention relates to both bias and radial-ply tires. In one embodiment, the present invention is a radial-ply tire. Radial-ply tire means a belted or circumferentially-restricted pneumatic tire in which the carcass ply cords which extend from bead to bead are laid at cord angles between 65° and 90° with respect to the equatorial plane of the tire.

The rubber composition for use in the tire component may contain a natural or synthetic diene derived rubber. Representative of the rubbers include medium vinyl polybutadiene, styrene-butadiene rubber, synthetic cis-1,4-polyisoprene, synthetic 3,4-polyisoprene, natural rubber, cis-polybutadiene, styrene-isoprene rubber, styrene-isoprene-butadiene rubber, acrylonitrile-butadiene rubber, carboxylated acrylonitrile-butadiene rubber and mixtures thereof. In one embodiment, the rubber is natural rubber, styrene-butadiene rubber or cis-polybutadiene.

The component of the tire of the present invention contains an in-situ resin that is the reaction product of a methylene acceptor and a combination methylene donor.

In-situ resins are formed in the rubber stock and involve the reaction of a methylene acceptor and a combination methylene donor. The term "methylene donor" is intended to mean a chemical capable of reacting with a methylene acceptor and generate the resin in-situ. By combination methylene donor, it is meant a combination of hexamethylenetetramine and at least one additional methylene donor. Examples of additional methylene donors which are suitable for use in the present invention in combination with hexamethylenetetramine include N-substituted oxymethylmelamines, of the general formula:

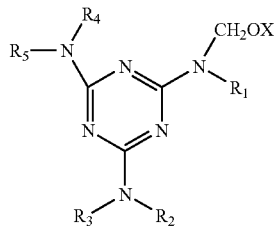

wherein X is hydrogen or an alkyl having from 1 to 8 carbon atoms, $R_1$, $R_2$, $R_3$, $R_4$ and $R_5$ are individually selected from the group consisting of hydrogen, an alkyl having from 1 to 8 carbon atoms, the group —$CH_2OX$ or their condensation products. Specific methylene donors include hexakis-(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl) melamine, N,N'N"-tributyl-N,N',N"-trimethylol-melamine, hexamethoxymethylmelamine, and hexaethoxymethylmelamine. The N-methylol derivatives of melamine are prepared by known methods.

The amount of hexamethylenetetramine in the rubber stock may vary. In one embodiment, the amount of hexamethylenetetramine ranges from 0.1 to 1 phr. In another embodiment, the amount of hexamethylenetetramine ranges from 0.2 to 0.6 phr.

The amount of additional methylene donor in the rubber stock may vary. In one embodiment, the amount of additional methylene donor ranges from 0.5 to 4 phr. In another embodiment, the amount of additional methylene donor ranges from 1 to 3 phr.

The weight ratio of additional methylene donor to hexamethylenetetramine in the rubber stock may vary. In one embodiment, the weight ratio ranges from about 15 to about 2. In another embodiment, the weight ratio ranges from about 12 to about 3.

The term "methylene acceptor" is known to those skilled in the art and is used to describe the reactant to which the methylene donor reacts to form what is believed to be a methylol monomer. The condensation of the methylol monomer by the formation of a methylene bridge produces the resin. The initial reaction that contributes the moiety that later forms into the methylene bridge is the methylene donor wherein the other reactant is the methylene acceptor. Representative compounds which may be used as a methylene acceptor include but are not limited to resorcinol, resorcinolic derivatives, monohydric phenols and their derivatives, dihydric phenols and their derivatives, polyhydric phenols and their derivatives, unmodified phenol novolak resins, modified phenol novolak resin, resorcinol novolak resins and mixtures thereof. Examples of methylene acceptors include but are not limited to those disclosed in U.S. Pat. No. 6,605,670; U.S. Pat. No. 6,541,551; U.S. Pat. No. 6,472,457; U.S. Pat. No. 5,945,500; U.S. Pat. No. 5,936,056; U.S. Pat. No. 5,688,871; U.S. Pat. No. 5,665,799; U.S. Pat. No. 5,504,127; U.S. Pat. No. 5,405,897; U.S. Pat. No. 5,244,725; U.S. Pat. No. 5,206,289; U.S. Pat. No. 5,194,513; U.S. Pat. No. 5,030,6.92; U.S. Pat. No. 4,889,481; U.S. Pat. No. 4,605,696; U.S. Pat. No. 4,436,853; and U.S. Pat. No. 4,092,455. Examples of modified phenol novolak resins include but are not limited to cashew nut oil modified phenol novolak resin, tall oil modified phenol novolak resin and alkyl modified phenol novolak resin. In one embodiment, the methylene acceptor is resorcinol.

Other examples of methylene acceptors include activated phenols by ring substitution and a cashew nut oil modified novalak-type phenolic resin. Representative examples of activated phenols by ring substitution include resorcinol, cresols, t-butyl phenols, isopropyl phenols, ethyl phenols and mixtures thereof. Cashew nut oil modified novolak-type phenolic resins are commercially available from Schenectady Chemicals Inc under the designation SP6700. The modification rate of oil based on total novolak-type phenolic resin may range from 10 to 50 percent. For production of the novolak-type phenolic resin modified with cashew nut oil, various processes may be used. For example, phenols such as phenol, cresol and resorcinol may be reacted with aldehydes such as formaldehyde, paraformaldehyde and benzaldehyde using acid catalysts. Examples of acid catalysts include oxalic acid, hydrochloric acid, sulfuric acid and p-toluenesulfonic acid. After the catalytic reaction, the resin is modified with the oil.

The amount of methylene acceptor in the rubber stock may vary. In one embodiment, the amount of methylene acceptor ranges from 0.5 to 5 phr. In another embodiment, the amount of methylene acceptor ranges from 1 to 3 phr.

It is readily understood by those having skill in the art that the rubber compositions used in tire components would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

The rubber compound may contain various conventional rubber additives. In one embodiment, the addition of carbon black comprises about 20 to 200 parts by weight of diene rubber (phr). In another embodiment, from about 50 to about 100 phr of carbon black is used.

A number of commercially available carbon blacks may be used. Included in the list of carbon blacks are those known under the ASTM designations N299, N315, N326, N330, M332, N339, N343, N347, N351, N358, N375, N539, N550 and N582. Such processing aids may be present and can include, for example, aromatic, naphthenic, and/or paraffinic processing oils. Typical amounts of tackifying resins, such as phenolic tackifiers, range from 1 to 3 phr. Silica, if used, may be used in an amount of about 5 to about 80 phr, often with a silica coupling agent. Representative silicas may be, for example, hydrated amorphous silicas. Typical amounts of antioxidants comprise about 1 to about 5 phr. Representative antioxidants may be, for example, diphenyl-p-phenylenediamine, polymerized 1,2-dihydro-2, 2,4-trimethylquinoline and others, such as, for example, those disclosed in the *Vanderbilt Rubber Handbook* (1990), Pages 343 through 362. Typical amounts of antiozonants comprise about 1 to about 5 phr. Representative antiozonants may be, for example, those disclosed in the *Vanderbilt Rubber Handbook* (1990), Pages 363 through 367. Typical amounts of fatty acids, if used, which can include stearic acid comprise about 0.5 to about 3 phr. Typical amounts of zinc oxide comprise about 2 to about 10 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide. The presence and relative amounts of the above additives are considered to be not an aspect of the present invention which is more primarily directed to the utilization of the combination of the reaction product of the methylene acceptor and combination methylene donor.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. In one embodiment, the sulfur vulcanizing agent is elemental sulfur. In one embodiment, sulfur vulcanizing agents are used in an amount ranging from about 0.5 to about 8 phr. In another embodiment about 3 to about 5 phr of sulfur vulcanizing agents are used.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2.5 phr. In another embodiment, combinations of two or more accelerators may be used, including a primary accelerator which is generally used in the larger amount (0.5 to 2.0 phr), and a secondary accelerator which is generally used in smaller amounts (0.05 to 0.50 phr) in order to activate and to improve the properties of the vulcanizate. Combinations of these accelerators have been known to produce a synergistic effect of the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. In another embodiment, if a second accelerator is used, the secondary accelerator may be a guanidine, dithiocarbamate or thiuram compound.

The rubber compound may contain any of the cobalt materials known in the art to further promote the adhesion of rubber to metal. One advantage of the present invention is the reduction and possible elimination of cobalt compounds. However, it may be desirable to have some amounts that are present. Thus, suitable cobalt materials which may be employed include cobalt salts of fatty acids such as stearic, palmitic, oleic, linoleic and the like; cobalt salts of aliphatic or alicyclic carboxylic acids having from 6 to 30 carbon atoms, such as cobalt neodecanoate; cobalt chloride, cobalt naphthenate; cobalt carboxylate and an organo-cobalt-boron complex commercially available under the designation Manobond C from Wyrough and Loser, Inc, Trenton, N.J. Manobond C is believed to have the structure:

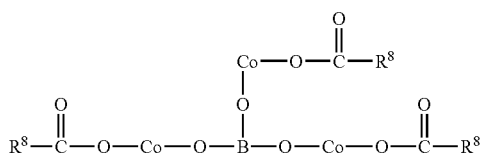

in which $R^8$ is an alkyl group having from 9 to 12 carbon atoms.

Amounts of cobalt compound which may be employed depend upon the specific nature of the cobalt material selected, particularly the amount of cobalt metal present in the compound.

In one embodiment, the amount of the cobalt material may range from about 0.2 to 5 phr. In another embodiment, the amount of cobalt compound may range from about 0.5 to 3 phr. In one embodiment, the amount of cobalt material present in the stock composition is sufficient to provide from about 0.01 percent to about 0.50 percent by weight of cobalt metal based upon total weight of the rubber stock composition. In another embodiment, the amount of cobalt material present in the stock composition is sufficient to provide from about 0.03 percent to about 0.2 percent by weight of cobalt metal based on total weight of wire coat composition.

The tire can be built, shaped, molded and cured by various methods which will be readily apparent to those having skill in such art.

The prepared tire of this invention is conventionally shaped and cured by methods known to those having skill in such art.

The invention may be better understood by reference to the following examples in which the parts and percentages are by weight unless otherwise indicated.

EXAMPLE I

In this example, the effect of replacing hexamethoxymethylmelamine with a mixed methylene donor is demonstrated for rubber compounds containing carbon black. Two experimental rubber compounds were prepared in a lab Banbury mixer as indicated in Table 1, with amounts expressed in parts per hundred rubber (phr). Physical properties of the compounds were evaluated as indicated in Table 2.

Cure properties were determined using a Monsanto oscillating disc rheometer. A description of oscillating disc rheometers can be found in the Vanderbilt Rubber Handbook edited by Robert O. Ohm (Norwalk, Conn., R. T. Vanderbilt Company, Inc., 1990), Pages 554 through 557. The use of this cure meter and standardized values read from the curve are specified in ASTM D-2084. A typical cure curve obtained on an oscillating disc rheometer is shown on Page 555 of the 1990 edition of *The Vanderbilt Rubber Handbook*.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The following tables report cure properties that were determined from cure curves that were obtained for the rubber stocks that were prepared. These properties include a torque minimum (Min. Torque), a torque maximum (Max. Torque), Delta torque and minutes to 90 percent of the torque increase ($T_{90}$).

Standard wire and textile cord adhesion tests (SWAT) were conducted by embedding a single cord in the respective rubber compositions. The rubber articles were then cured as indicated. The cord in these rubber compositions were then subjected to a pull-out test, according to ASTM Standard D2229-73. The results of these pull-out tests (SWAT) and percent rubber coverage are given below and expressed in Newtons.

TABLE 1

| First Non-Productive Mixing Stage | |
|---|---|
| Cis-1,4-polyisoprene rubber[1] | 100 |
| Carbon black[2] | 60 |
| Processing aids[3] | 2 |
| Fatty acid[4] | 2 |
| Zinc oxide | 5 |
| Resorcinol | 2 |
| Second Non-Productive Mixing Stage | |
| Remill of First Non-productive | — |
| Productive Mixing Stage | |
| Antioxidant[5] | 0.75 |
| Zinc oxide | 3 |
| Sulfur[6] | 5 |
| Sulfenamide accelerator | 1 |
| Hexamethoxymethylmelamine | 3 |
| Hexamethylenetetramine | see Table 2 |
| Retarder[7] | 0.2 |

[1]50/50 blend of natural rubber and NAT2200 from The Goodyear Tire & Rubber Company
[2]N326, a carbon black ASTM designation
[3]Blend of naphthenic/paraffinnic processing oil and phenolic tackifier
[4]Blend of stearic, palmitic and oleic acids
[5]Wingstay ® 100 from The Goodyear Tire & Rubber Company
[6]Insoluble sulfur, 80% active
[7]Phthalimide type

TABLE 2

| Sample | A control | B invention |
|---|---|---|
| Hexamethoxymethylmelamine, phr | 3 | 3 |
| Hexamethylenetetramine, phr | 0 | 0.5 |
| Methylene Donor Weight Ratio | — | 6 |
| Rheometer, 170° C. | | |
| Maximum torque (dNm) | 51.64 | 46.69 |

TABLE 2-continued

| Sample | A control | B invention |
|---|---|---|
| Minimum torque (dNm) | 2.28 | 2.99 |
| Delta torque (dNm) | 49.36 | 43.7 |
| T$_{90}$ (minutes) | 4.48 | 3.40 |
| Stress-strain (23 minutes at 170° C.) | | |
| Tensile strength (MPa) | 9.89 | 10.81 |
| Elongation at break (%) | 225 | 235 |
| 100% modulus (MPa) | 4.19 | 4.24 |
| Rebound, 100° C. (%) | 59 | 61 |
| Hardness, 100° C. | 81 | 82 |
| Tear strength, N (95° C.) | 46 | 58 |
| Unaged Wire Adhesion, N (% rubber coverage) | | |
| cured 6 minutes at 170° C. | 486 (25%) | 649 (85%) |
| cured 23 minutes at 170° C. | 471 (35%) | 670 (85%) |
| Aged Wire Adhesion, N (% rubber coverage) Cured 23 minutes at 170° C., measured at room temperature | | |
| Aged at 90% RH, 10 days, 75° C. | 544 (40%) | 788 (80%) |
| Aged at 90% RH, 20 days, 75° C. | 610 (75%) | 676 (95%) |
| Aged in Water, 20 days, 90° C. | 272 (10%) | 620 (75%) |
| Aged in N$_2$, 10 days, 120° C. | 534 (85%) | 620 (95%) |
| Cord Adhesion, N Cured 23 minutes at 170° C., measured at room temperature | | |
| Polyester | 217 | 251 |
| Nylon | 232 | 230 |
| Flexten | 242 | 176 |
| Monsanto RPA 1%, 100° C., 1 hz | | |
| G' at 10% strain (KPa) | 4540 | 4213 |
| Tan delta at 10% strain | 0.174 | 0.156 |

Surprisingly and unexpectedly, both aged and unaged wire adhesion in various environments is improved with use of a combined methylene donor of hexamethoxymethylmelamine and hexamethylenetetramine (Sample B) as compared to hexamethoxymethylmelamine alone (Sample A). In particular, use of the combined methylene donors in the weight ratio range of the present invention shows marked improvement in wire adhesion of the rubber compound as compared to the control.

EXAMPLE II

In this example, the effect of replacing hexamethoxymethylmelamine with a mixed methylene donor is demonstrated for rubber compounds containing carbon black and a cobalt salt. Five experimental rubber compounds were prepared in a lab Banbury mixer as indicated in Table 3. Physical properties of the compounds were evaluated as indicated in Table 4. Experimental methods are as described in Example I.

TABLE 3

| First Non-Productive Mixing Stage | |
|---|---|
| Cis-1,4-polyisoprene rubber[1] | 100 |
| Carbon black[2] | 60 |
| Processing aids[3] | 2 |
| Fatty acid[4] | 2 |
| Zinc oxide | 5 |
| Resorcinol | 2 |
| Cobalt Salt[5] | 3 |
| Second Non-Productive Mixing Stage | |
| Remill of First Non-productive | — |
| Productive Mixing Stage | |
| Antioxidant[6] | 0.75 |
| Zinc oxide | 3 |
| Sulfur[7] | 5 |
| Sulfenamide accelerator | 1.3 |
| Hexamethoxymethylmelamine | 3 |
| Hexamethylenetetramine | see Table 4 |
| Retarder[8] | 0.2 |

[1]50/50 blend of natural rubber and NAT2200 from The Goodyear Tire & Rubber Company
[2]N326, a carbon black ASTM designation
[3]Blend of naphthenic/paraffinnic processing oil and phenolic tackifier
[4]Blend of stearic, palmitic and oleic acids
[5]Cobalt napthenate, 10.5% by weight cobalt.
[6]Wingstay ® 100 from The Goodyear Tire & Rubber Company
[7]Insoluble sulfur, 80% active
[8]Phthalimide type

TABLE 4

| Sample | C control | D | E | F | G |
|---|---|---|---|---|---|
| Hexamethoxymethylmelamine, phr | 3 | 3 | 3 | 3 | 3 |
| Hexamethylenetetramine, phr | 0 | 0.25 | 0.5 | 1 | 2 |
| Methylene Donor Weight Ratio | — | 12 | 6 | 3 | 1.5 |
| Rheometer, 170° C. | | | | | |
| Maximum torque (dNm) | 48.2 | 46.7 | 45.8 | 44.1 | 41.3 |
| Minimum torque (dNm) | 3.16 | 3.21 | 3.2 | 3.25 | 3.24 |
| Delta torque (dNm) | 45.0 | 43.5 | 42.6 | 40.9 | 38.0 |
| T90 (minutes) | 4.18 | 4.12 | 4.2 | 4.34 | 4.45 |
| Stress-strain (23 minutes at 170° C.) | | | | | |
| Tensile strength (MPa) | 13.5 | 14.3 | 14.2 | 15.3 | 15.3 |
| Elongation at break (%) | 282 | 295 | 297 | 321 | 336 |
| 100% modulus (MPa) | 4.41 | 4.43 | 4.38 | 4.23 | 3.87 |
| Rebound, 100° C. (%) | 50 | 50 | 50 | 49 | 49 |
| Hardness, 100° C. | 82 | 82 | 83 | 82 | 82 |
| Tear strength, N (95° C.) | 51 | 53 | 50 | 35 | 42 |
| Unaged Wire Adhesion, N Cured 35 minutes at 155° C. | | | | | |

TABLE 4-continued

| Sample | C control | D | E | F | G |
|---|---|---|---|---|---|
| Measured at room temperature | 789 | 809 | 830 | 831 | 793 |
| Measured at 95° C. | 679 | 673 | 711 | 684 | 690 |
| Cured 23 minutes at 170° C. | | | | | |
| Measured at room temperature | 743 | 752 | 758 | 731 | 672 |
| Measured at 95° C. | 572 | 606 | 610 | 568 | 512 |
| Aged Wire Adhesion, N | | | | | |
| Cured 23 minutes at 170° C., measured at room temperature | | | | | |
| Aged at 90% RH, 20 days, 75° C. | 595 | 647 | 742 | 652 | 643 |
| Aged in Water, 20 days, 90° C. | 298 | 317 | 407 | 500 | 270 |
| Aged in N₂, 10 days, 120° C. | 763 | 843 | 798 | 651 | 689 |
| Cord Adhesion, N | | | | | |
| Cured 23 minutes at 170° C., measured at room temperature | | | | | |
| Polyester | 197 | 197 | 185 | 221 | 152 |
| Nylon | 247 | 218 | 248 | 245 | 225 |
| Flexten | 142 | 137 | 166 | 170 | 181 |

Surprisingly and unexpectedly, both aged and unaged wire adhesion in various environments is improved with use of a combined methylene donor of hexamethoxymethylmelamine and hexamethylenetetramine (Samples D, E, F) as compared to hexamethoxymethylmelamine alone (Sample C). In particular, use of the combined methylene donors in the weight ratio range of the present invention shows marked improvement in wire adhesion of the rubber compound as compared to the control.

While the embodiments described herein have been directed to a rubber composition and a tire, the present invention is not so limited. The rubber composition may also be used in various applications, including but not limited to power transmission belts, hoses, tracks, tires, air sleeves, and conveyor belts.

While certain representative embodiments and details have been shown for the purpose of illustrating the subject invention, it will be apparent to those skilled in this art that various changes and modifications can be made therein without departing from the scope of the subject invention.

What is claimed is:

1. A pneumatic tire comprising a wirecoat composition comprising
   (A) a sulfur-vulcanized rubber compound; and
   (B) the reaction product of
      (1) a methylene acceptor; and
      (2) a combination methylene donor comprising from 0.2 to 0.6 phr of hexamethylenetetramine and an amount of at least one additional methylene donor, wherein the weight ratio of said at least one additional methylene donor to said hexamethylenetetramine ranges from about 12:1 to about 3:1 wherein the at least one additional methylene donor is selected from N-substituted oxymethyl melamines of the formula:

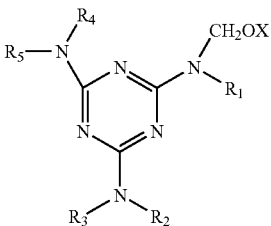

wherein X is hydrogen or an alkyl having from 1 to 8 carbon atoms, $R_1$, $R_2$, $R_3$, $R_4$ and $R_5$ are individually selected from the group consisting of hydrogen, an alkyl having from 1 to 8 carbon atoms, the group —$CH_2OX$ and their condensation products.

2. The tire of claim 1 wherein said rubber comprises a member selected from the group consisting of medium vinyl polybutadiene, styrene-butadiene rubber, synthetic cis-1,4-polyisoprene, synthetic 3,4-polyisoprene, natural rubber, cis-polybutadiene, styrene-isoprene rubber, styrene-isoprene-butadiene rubber, acrylonitrile-butadiene rubber, carboxylated acrylonitrile-butadiene rubber and mixtures thereof.

3. The tire of claim 1 wherein said additional methylene donor comprises a member selected from the group consisting of hexakis-(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl)melamine, N,N'N"-tributyl-N,N',N"-trimethylol-melamine, hexamethoxymethylmelamine, and hexaethoxymethylmelamine.

4. The tire of claim 1 wherein said additional methylene donor comprises hexamethoxymethylmelamine.

5. The tire of claim 1 wherein the amount of additional methylene donor ranges from 0.5 to 4 phr.

6. The tire of claim 1, where the methylene acceptor comprises a member selected from resorcinol, resorcinolic derivatives, monohydric phenols and their derivatives, dihydric phenols and their derivatives, polyhydric phenols and their derivatives, unmodified phenol novolak resins, modified phenol novolak resin, resorcinol novolak resins and mixtures thereof.

7. The tire of claim 1, wherein the methylene acceptor comprises resorcinol.

8. The tire of claim 1, wherein the wirecoat composition further comprises from about 0.2 to 5 phr of a cobalt compound.

9. The tire of claim 8, wherein the cobalt compound is selected from the group consisting of cobalt salts of fatty acids such as stearic, palmitic, oleic, linoleic and the like; cobalt salts of aliphatic or alicyclic carboxylic acids having from 6 to 30 carbon atoms, such as cobalt neodecanoate; cobalt chloride, cobalt naphthenate; cobalt carboxylate and an organo-cobalt-boron complex.

10. The tire of claim 8, wherein the cobalt compound is cobalt naphthenate.

11. A pneumatic tire comprising a wirecoat composition, the wirecoat composition comprising
(A) a natural or synthetic diene derived rubber;
(B) the reaction product of
  (1) from 0.5 to 5 phr of a methylene acceptor; and
  (2) from 0.2 to 0.6 phr of hexamethylenetetramine and from 0.5 to 4 phr of hexamethoxymethylmelamine, wherein the weight ratio of hexamethoxymethylmelamine to hexamethylenetetramine ranges from about 12:1 to about 3:1; and
(C) from about 0.2 to about 4 phr of a cobalt compound.

12. The pneumatic tire of claim 11, wherein the cobalt compound is selected from the group consisting of cobalt salts of fatty acids such as stearic, palmitic, oleic, linoleic and the like; cobalt salts of aliphatic or alicyclic carboxylic acids having from 6 to 30 carbon atoms, such as cobalt neodecanoate; cobalt chloride, cobalt naphthenate; cobalt carboxylate and an organo-cobalt-boron complex.

13. The pneumatic tire of claim 11, wherein the cobalt compound is cobalt naphthenate.

14. The pneumatic tire of claim 11, wherein the methylene acceptor is resorcinol.

* * * * *